United States Patent
Kim et al.

(10) Patent No.: US 12,127,101 B2
(45) Date of Patent: Oct. 22, 2024

(54) METHOD FOR PERFORMING DISCOVERY PROCEDURE BY TERMINAL IN WIRELESS COMMUNICATION SYSTEM SUPPORTING SIDELINK, AND APPARATUS THEREFOR

(71) Applicant: LG Electronics Inc., Seoul (KR)

(72) Inventors: Heejin Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 17/631,213

(22) PCT Filed: Aug. 24, 2020

(86) PCT No.: PCT/KR2020/011259
§ 371 (c)(1),
(2) Date: Jan. 28, 2022

(87) PCT Pub. No.: WO2021/034166
PCT Pub. Date: Feb. 25, 2021

(65) Prior Publication Data
US 2022/0272618 A1    Aug. 25, 2022

(30) Foreign Application Priority Data

Aug. 22, 2019  (KR) .................. 10-2019-0103294
Oct. 2, 2019   (KR) .................. 10-2019-0122353

(51) Int. Cl.
*H04W 48/16*   (2009.01)
*H04W 4/40*    (2018.01)
*H04W 72/52*   (2023.01)

(52) U.S. Cl.
CPC ............ *H04W 48/16* (2013.01); *H04W 4/40* (2018.02); *H04W 72/52* (2023.01)

(58) Field of Classification Search
CPC .......... H04W 4/40; H04W 4/30; H04W 4/42; H04W 4/44; H04W 4/46; H04W 4/48; H04W 48/08; H04W 48/12; H04W 48/16; H04W 48/00; H04W 48/18; H04W 92/18; H04W 92/16; H04W 92/00; H04W 72/00; H04W 72/04; H04W 72/044; H04W 72/0446; H04W 72/0453; H04W 72/0457; H04W 72/046; H04W 72/0466;
(Continued)

(56) References Cited

FOREIGN PATENT DOCUMENTS

| WO | WO2016060481 | 4/2016 |
|----|--------------|--------|
| WO | WO2017176099 | 10/2017 |

OTHER PUBLICATIONS

International Search Report in International Appln. No. PCT/KR2020/011259, dated Nov. 30, 2020, 12 pages (with English translation).
(Continued)

*Primary Examiner* — Diana J. Cheng
(74) *Attorney, Agent, or Firm* — Fish & Richardson P.C.

(57) ABSTRACT

Disclosed according to various embodiments are a method for performing a discovery procedure by a first user equipment (UE) in a wireless communication system supporting a sidelink, and an apparatus therefor. Disclosed are a method and an apparatus therefor, the method comprising the steps of: receiving a discovery signal; and transmitting a discovery response signal, wherein the discovery response signal includes information on a first resource region selected from among a plurality of resource regions for sidelink communication related to the discovery signal.

10 Claims, 17 Drawing Sheets

(58) Field of Classification Search
CPC . H04W 72/0473; H04W 72/20; H04W 72/23; H04W 72/231; H04W 72/232; H04W 72/25; H04W 72/02; H04W 72/40
See application file for complete search history.

(56) References Cited

OTHER PUBLICATIONS

Nokia & Nokia Shanghai Bell, "Summary of AI 7.2.4.6, QoS Management," R1-1907654, Presented at 3GPP TSG RAN WG1 #97, Reno, USA, May 13-17, 2019, 9 pages.
SA2, "LS response on unicast, groupcast and broadcast in NR sidelink," R1-1905944, Presented at 3GPP TSG RAN WG1 #97, Reno, USA, May 13-17, 2019, 3 pages.
ZTE & Sanechips, "Overall consideration on NR V2X resource allocation," R2-1816981, Presented at 3GPP TSG-RAN WG2#104, 7 pages.

(a)

(b)

(a)

(b)

METHOD FOR PERFORMING DISCOVERY PROCEDURE BY TERMINAL IN WIRELESS COMMUNICATION SYSTEM SUPPORTING SIDELINK, AND APPARATUS THEREFOR

CROSS-REFERENCE TO RELATED APPLICATIONS

This application is a National Stage application under 35 U.S.C. § 371 of International Application No. PCT/KR2020/011259, filed on Aug. 24, 2020, which claims the benefit of Korean Application Nos. 10-2019-0122353, filed on Oct. 2, 2019, and 10-2019-0103294, filed on Aug. 22, 2019. The disclosures of the prior applications are incorporated by reference in their entirety.

TECHNICAL FIELD

Embodiments of the present disclosure relate to a method for performing a discovery procedure by a user equipment (UE) in a wireless communication system supporting a sidelink, and an apparatus for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object of the present disclosure is to provide a method and apparatus for selecting a resource region to be used for sidelink communication from among a plurality of preconfigured resource regions (resource pools or BWPs) using a discovery procedure, so that a resource region for efficient sidelink communication can be selected using a discovery procedure.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for performing a discovery procedure by a first user equipment (UE) in a wireless communication system supporting sidelink may include receiving a discovery signal; and transmitting a discovery response signal, wherein the discovery response signal includes information about a first resource region selected from among a plurality of resource regions for sidelink communication related to the discovery signal.

The first resource region may be selected based on at least one of a maximum transmit power, a congestion level, a priority, and a CP length for each of the plurality of resource regions.

The first resource region may be a resource region having the highest maximum transmission power from among the plurality of resource regions, a resource region having the longest cyclic prefix (CP) length from among the plurality of resource regions, or a resource region in which the lowest congestion level is measured from among the plurality of resource regions.

The first resource region may be a resource region selected from among the plurality of resource regions based on at least one of a distance to a second UE scheduled to perform the sidelink communication and a minimum communication range requirement.

The discovery response signal may further include preferred beam information determined based on the discovery signal that is repeatedly received based on beam cycling.

The preferred beam information may be used as auxiliary information in determining a beam direction for the sidelink communication.

When the discovery signal is received in each of a plurality of discovery resource regions, the discovery response signal may be transmitted only in a discovery resource region linked to the first resource region from among the plurality of discovery resource regions.

When the discovery signal is received in each of a plurality of discovery resource regions, the discovery response signal may be transmitted in one discovery resource region selected based on at least one of a maximum transmission power, a congestion level, and a cyclic prefix (CP) length from among the plurality of discovery resource regions.

When the discovery signal is received in each of a plurality of discovery resource regions, the discovery response signal may be repeatedly transmitted in each of the plurality of discovery resource regions.

The sidelink communication may be performed in the first resource region based on a numerology configured in the first resource region.

In accordance with another aspect of the present disclosure, a first user equipment (UE) configured to perform a discovery procedure in a wireless communication system supporting sidelink may include a radio frequency (RF) transceiver; and a processor connected to the RF transceiver, wherein, under control of the RF transceiver, the processor is configured to receive a discovery signal; and transmit a discovery response signal, wherein the discovery response signal includes information about a first resource region selected from among a plurality of resource regions for sidelink communication related to the discovery signal.

Advantageous Effects

Various embodiments of the present disclosure can select a resource region to be used for sidelink communication using a discovery procedure in a communication system supporting a plurality of preconfigured resource regions (resource pools or BWPs), so that efficient sidelink communication can be performed.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
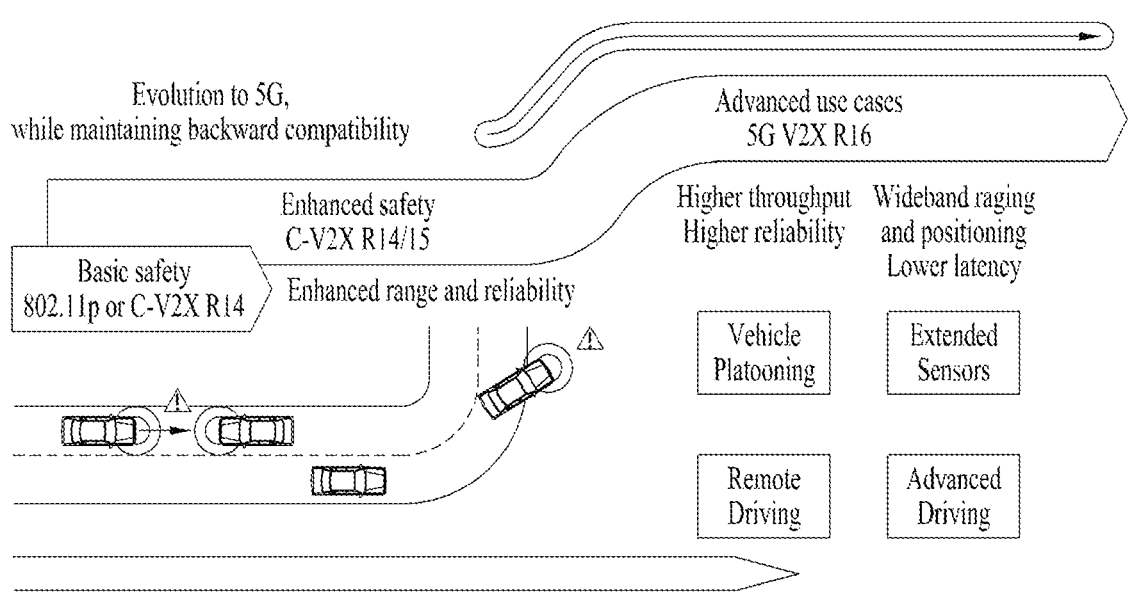
FIG. 1 is a diagram for explaining by comparing V2X communication based on RAT before NR and V2X communication based on NR.

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
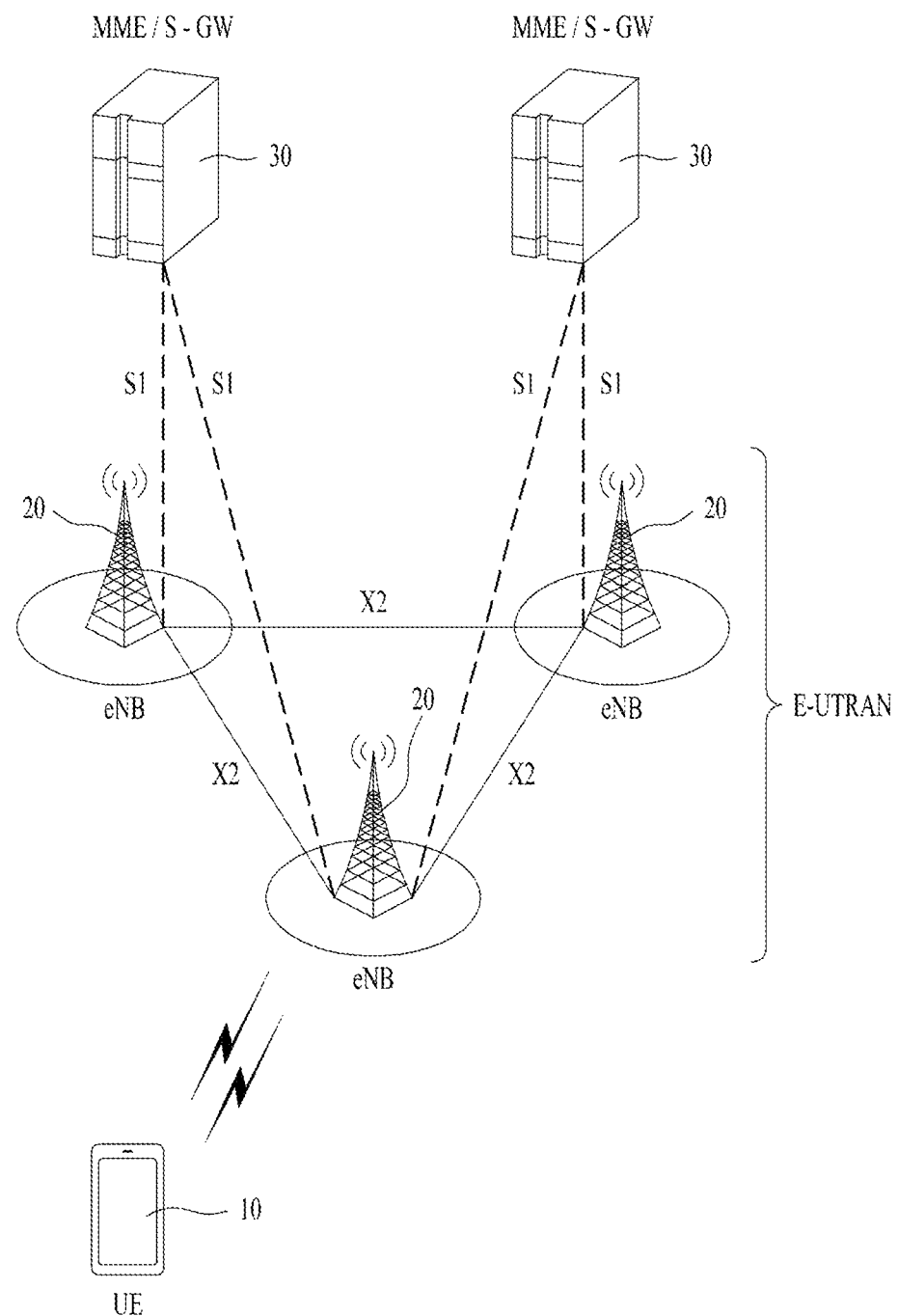
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
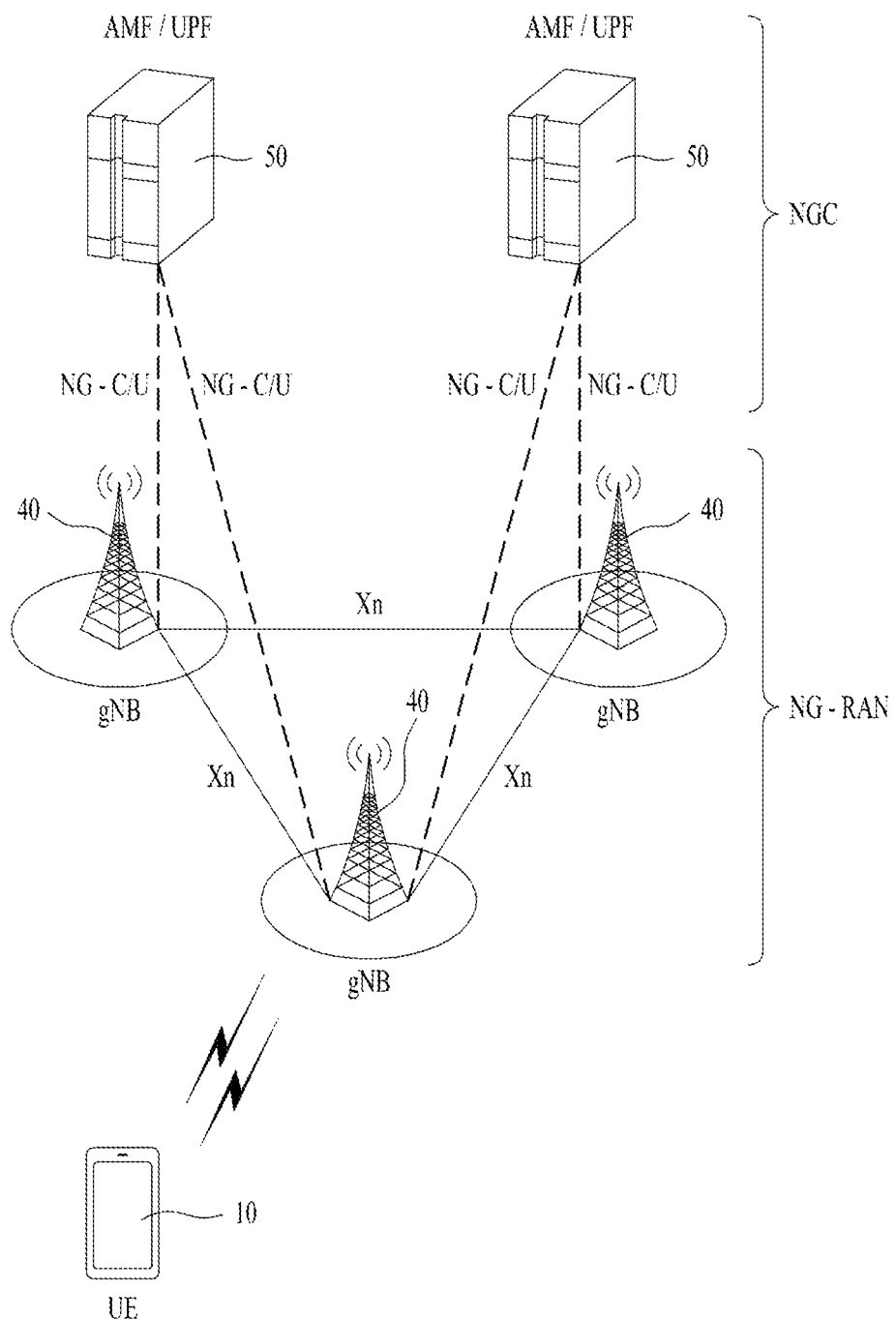
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
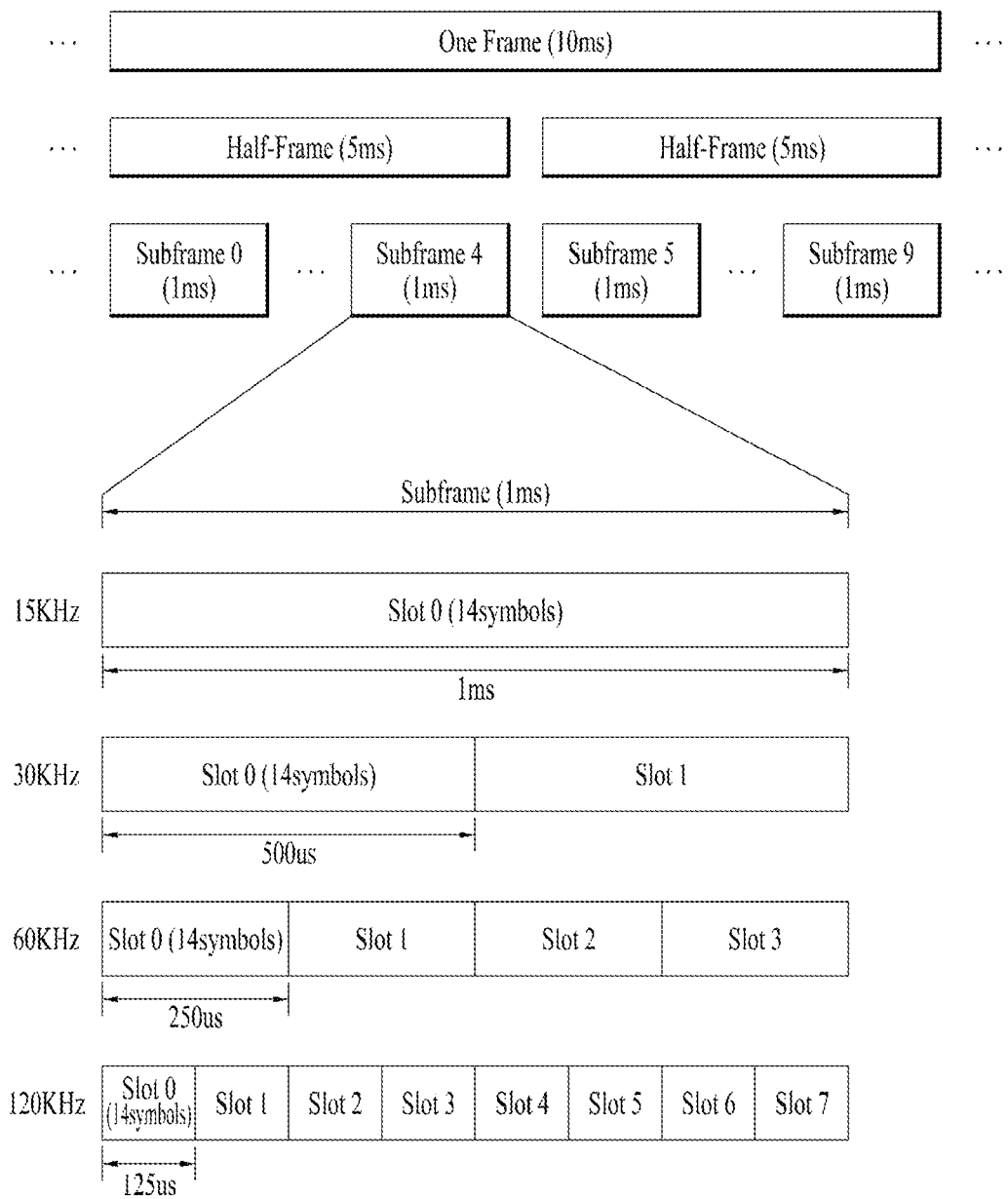
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
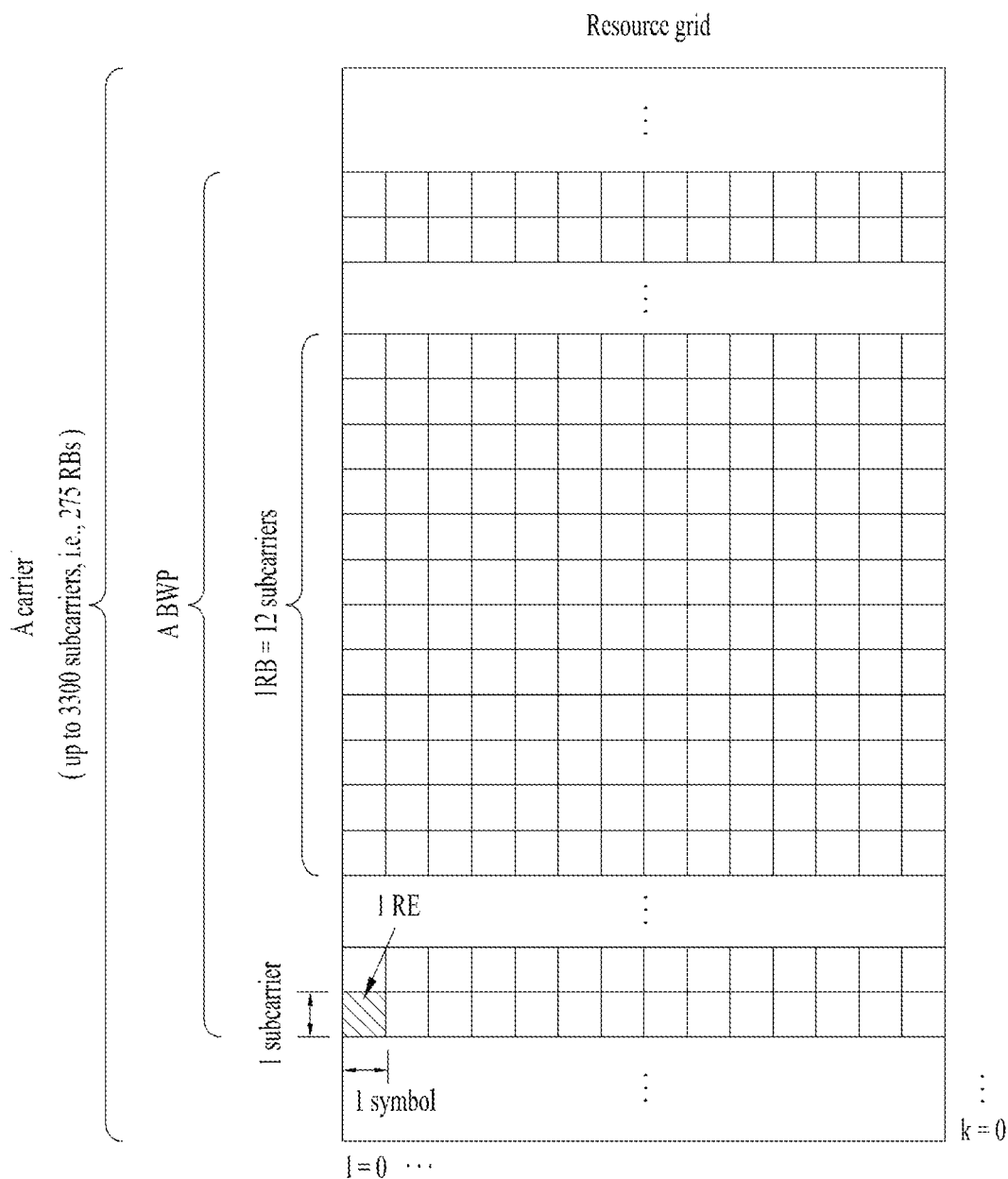
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
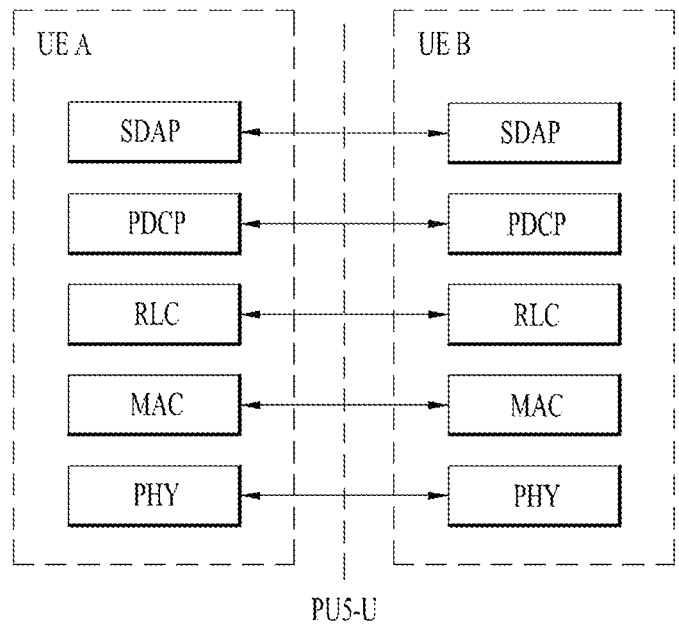
FIG. 6 illustrates a radio protocol architecture for SL communication.
Figure 6:
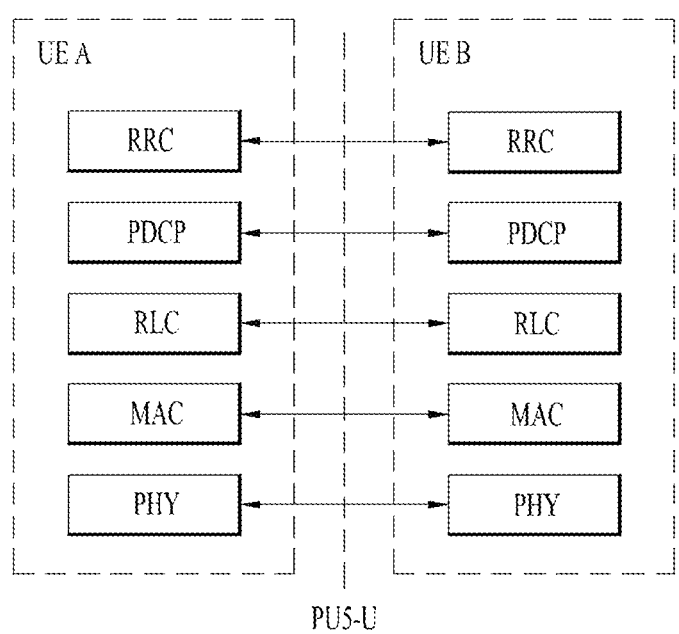

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
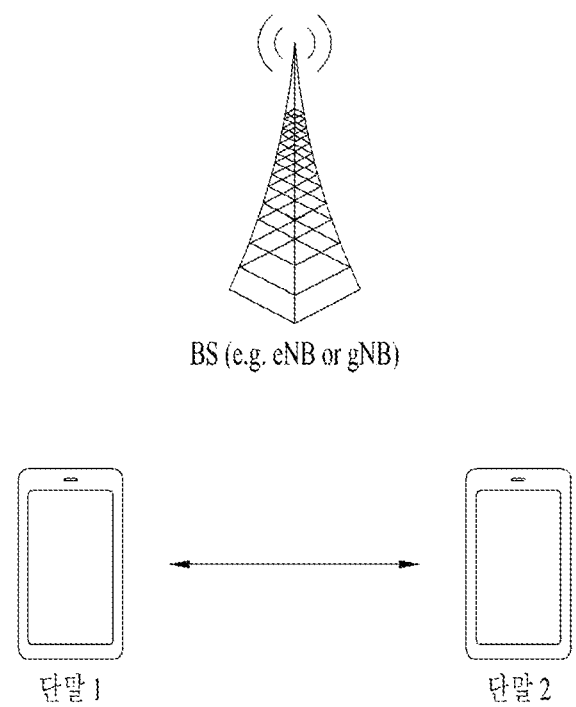
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
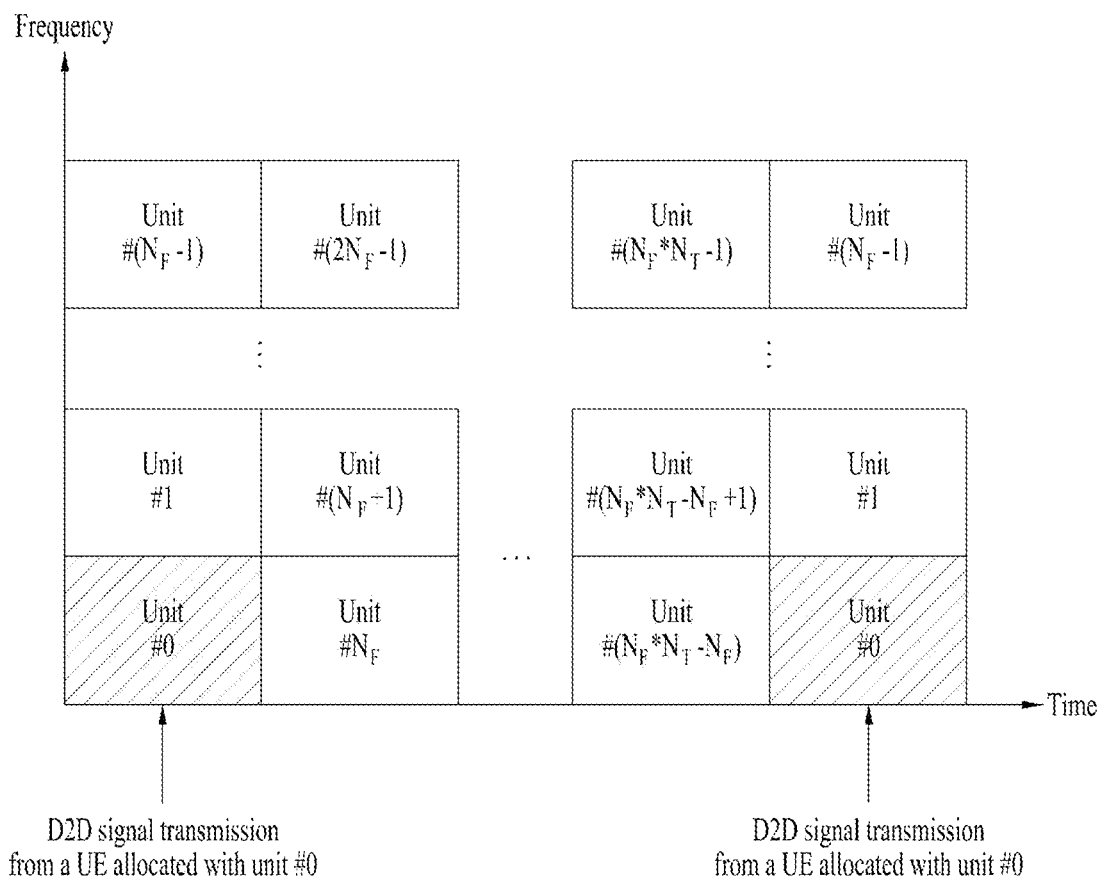
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
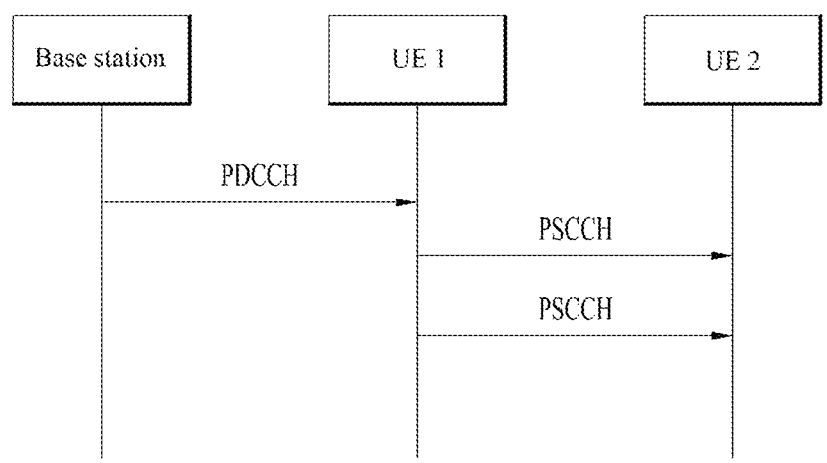
FIG. 9 illustrates a procedure in which UEs perform V2X or SL communication according to a transmission mode.
Figure 9:
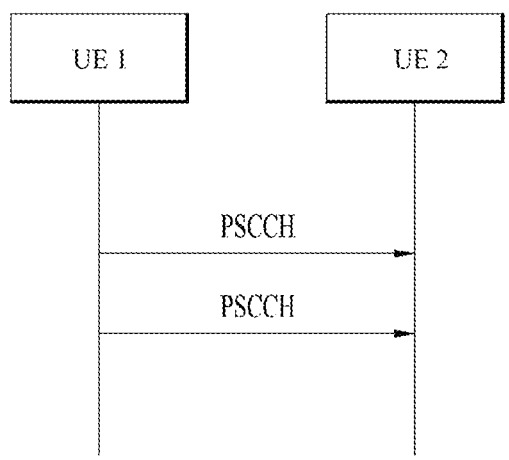

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Multiple Active Sidelink BWPs (Bandwidth Parts)

In NR V2X, communication based on supporting of a plurality of BWPs (i.e., communication based on supporting of a plurality of configured sidelink BWPs and/or communication through supporting of a plurality of active sidelink BWPs) may be considered. The reason why the above-described operation is performed is to support heterogeneous services/communications that require different numerologies, parameters and/or requirements, or is to reduce ICI caused by a shortened CP length.

A method of selecting a communication resource pool and/or BWP based on a discovery operation in consideration of the operation of supporting the plurality of BWPs will hereinafter be described.

Figure 10:
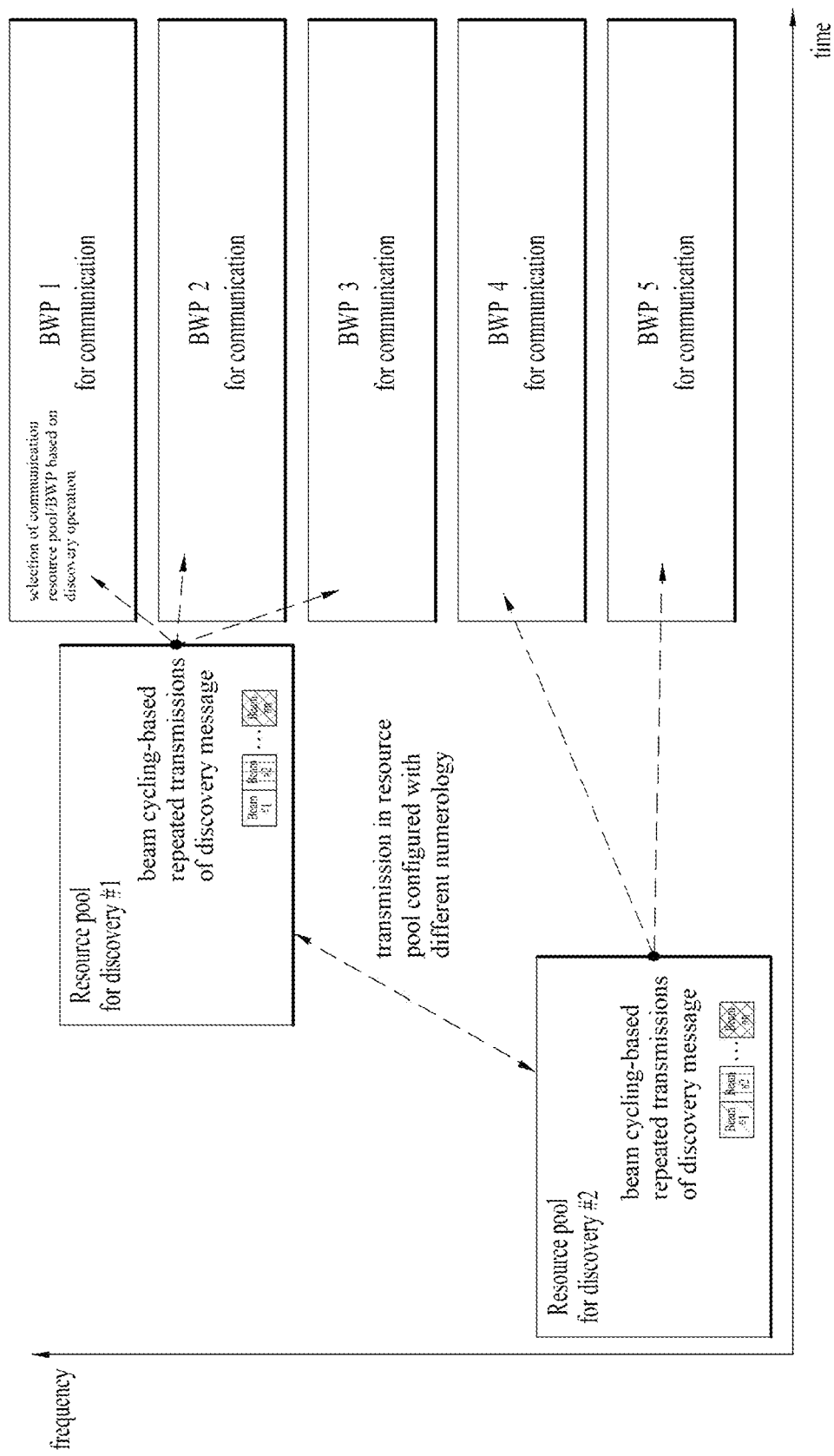
FIG. 10 is a diagram illustrating a method of performing a discovery procedure in sidelink communication in which a plurality of BWPs is supported.

FIG. 10 is a diagram illustrating a method of performing a discovery procedure in sidelink communication in which a plurality of BWPs is supported.

Referring to FIG. 10, the UE may search for a Tx-Rx unicast pair using a discovery message or a discovery signal, may select numerology to be used for sidelink data communication (or may select a resource pool/BWP in which numerology to be used is configured), or may perform beam sweeping and/or beam selection. In addition, through the discovery operation, the UE may establish a connection or session between the Rx UE and the Tx UE (in terms of communication) in the selected (and/or recommended) resource pool and/or BWP, and may perform transmission and reception of data packets.

On the other hand, in the following description for convenience of explanation, a resource pool or BWP associated with a discovery operation or procedure will hereinafter be defined as a discovery resource pool or a discovery BWP to distinguish a resource pool or BWP associated with a discovery operation or a procedure from the other resource pool or BWP associated with communication (subsequent to a discovery operation) such as a sidelink and data. Further, it is assumed that both the BWP and/or the resource pool are described below, although the BWP is defined or the resource pool is described in the following description.

At least one discovery resource pool (and/or discovery BWP) associated with the discovery operation may be configured, and one or more discovery resource pools (or one or more discovery BWPs) may be configured with the same or different numerologies. Alternatively, the same or different at least one numerology may also be configured in one discovery resource pool (or a discovery BWP). For example, the plurality of BWPs (or discovery BWPs) having different numerologies may be configured in one discovery resource pool (or one resource pool).

Alternatively, at least one discovery resource pool (or at least one discovery BWP) associated with the above-described discovery operation may be TDM- and/or FDM-processed. As shown in FIG. 10, discovery resource pools are TDM-processed, and some sections or symbols at the foremost or rearmost region of each discovery resource pool (or each discovery BWP) may be configured with a guard gap (or a switching gap). Here, the guard period (or switching gap) may be configured or used either as a switching section of the discovery BWP or the discovery resource pool or as a switching section of the numerology. Alternatively, the switching gap or the guard gap may be configured or required in the same or similar manner as in the resource pool or BWP for communication selected through the above discovery operation.

On the other hand, at least one condition may be considered in connection with the selection of numerology (or a resource pool/BWP in which the corresponding numerology is configured) to be used for communication. Here, the resource pool and/or BWP configured for transmission/reception of a communication-related signal may be a resource pool and/or BWP for control information, data, scheduling information, etc. for use in sidelink.

- Resource pool and/or BWP for communication in which the same numerology (e.g., SCS, CP type) as the discovery resource pool (and/or BWP) is configured.
- Resource pool and/or BWP for communication configured with an SCS smaller than an SCS of the discovery resource pool (and/or BWP).
- Resource pool and/or BWP for communication configured with a CP length that is longer than a CP length (e.g., extended CP) of the discovery resource pool (and/or BWP).

That is, for numerology to be used for communication, the SCS and/or CP type should be determined such that the CP length that is not shorter than the CP length associated with either the discovery resource or the resource pool to be used for communication.

Alternatively, at least one resource pool/BWP satisfying the above-described conditions for each discovery resource pool may be pre-linked, and a pair of UEs (hereinafter referred to as UE pair) having succeeded in a discovery procedure within a specific resource pool may select any one of a resource pool and/or a BWP for at least one communication linked to a corresponding discovery resource pool. For example, as shown in FIG. 10, BWP #1, BWP #2, and BWP #3 (or resource pools #1, #2 and #3 for communication) may be pre-linked to a discovery resource pool (and/or BWP) #1.

Transmission and reception of a discovery message (or a discovery response message) may be performed between one UE and the other UE within each discovery resource pool. When the reception (Rx) UE succeeds in decoding the discovery message, and/or when the transmission (Tx) UE succeeds in receiving/decoding the discovery response message, the Tx UE and the Rx UE may select at least one resource pool or BWP to be used for communication (or transmission/reception of data information, control information, or packet) in consideration of at least one of the following conditions from among communication BWPs (or resource pools or carriers) linked to either the resource pool/BWP or the corresponding discovery BWP to which the discovery message (and/or the discovery response message) is transmitted.

- Resource pool (or BWP) for communication in which relatively high maximum transmit (Tx) power is allowed
- Resource pool (or BWP) for communication with a relatively low congestion level (e.g., low CBR))
- Resource pool (or BWP) for communication in which numerology having a relatively short CP length is configured
- If the priority of a packet to be transmitted is greater than or equal to a specific value (e.g., if PPPP is equal to or less than a specific value), the resource pool (or BWP) in which the SCS and(or) the CP type, each of which guarantees a relatively long CP length, are configured can be used.

In other words, the Rx UE may acquire information about a discovery message or a discovery response message (or a received discovery message or a received discovery response message) that has been successfully decoded, or may acquire information about the plurality of resource pools (or BWPs) for communication linked to the discovery resource pool (or BWP) based on the numerology (e.g., SCS, CP type) of either the discovery message or the discovery response message, so that the Rx UE can select a resource pool or BWP to be used for communication from among the plurality of resource pools (or BWPs) based on at least one of transmit (Tx) power, a congestion level, a CP length, and/or priority of a transmit (Tx) packet for each resource pool for each communication.

Specifically, a resource pool and/or BWP configured to be used for communication may be selected or recommended as follows. Selection or recommendation of the resource pool and/or BWP may be performed by any one of the Tx UE and the Rx UE for use in the discovery operation. If selection or recommendation of the resource pool and/or BWP is performed by the Rx UE, information (e.g., BWP index) about the selected or recommended resource pool and/or BWP may be included in the discovery response message and signaled. If selection or recommendation of the resource pool and/or BWP by the Tx UE is performed, information (e.g., BWP index) about the selected or recommended resource pool and/or BWP may be signaled from the Tx UE to the Rx UE in the form of a subsequent message of the discovery response message.

Alternatively, a resource pool and/or BWP for communication may be selected or recommended as follows when transmission and reception of a discovery message based on a plurality of discovery resource pools and/or discovery BWPs configured with different numerologies are performed.

Specifically, the Rx UE may signal at least one discovery response message including information about the recommended or selected resource pool/BWP from among communication resource pool(s)/BWP(s) linked to all discovery resource pools/BWPs, even when a discovery message is received (or successfully decoded) in each of the plurality of discovery resource pools. In other words, the Rx UE may transmit a discovery response message including information (e.g., BWP index) about a resource pool or BWP for communication to be selected or recommended in at least one discovery resource pool without transmitting a response message for each of the plurality of discovery messages received from the plurality of discovery resource pools. Through the above-mentioned operation, the Rx UE can minimize a half-duplex problem caused by transmission of the plurality of discovery response messages and/or an increase in interference/overhead.

For example, as shown in FIG. 10, resource pools (or BWPs) #1, #2, and #3 for communication may be linked to a discovery resource pool (or discovery BWP) #1, and resource pools (or BWPs) #4 and #5 for communication may be linked to a discovery resource pool (or discovery BWP) #2 can be linked. In this case, based on the result of receiving each of the discovery resource pools (or discovery BWPs) #1 and #2, the Rx UE may signal (1) resource pool (or BWP) information for communication preferred for each of the discovery resource pools (or discovery BWPs) #1 and #2 through the same or different discovery response messages. Alternatively, based on the result of receiving each of the discovery resource pools (or discovery BWPs) #1 and #2, the Rx UE may select (2) at least one of a resource pool or BWP (corresponding to BWPs #1, #2, and #5 in FIG. 10) for all communications linked to the discovery resource pools (or discovery BWPs) #1 and #2, and may signal a discovery response message including information about a resource pool or BWP for the selected at least one communication.

Alternatively, the discovery response message may be equally (repeatedly) transmitted in all discovery resource pools/BWPs in which the discovery message was transmitted, or may be selectively transmitted in only one discovery resource pool/BWP selected from among the discovery resource pools/BWPs in which the discovery message was transmitted.

For example, the discovery response message may be transmitted through a discovery resource pool and/or BWP linked to a selected/recommended communication resource pool/BWP. Alternatively, the UE may select at least one discovery resource pool/BWP from among the plurality of discovery resource pools (or from among discovery resource pools in which the discovery message was transmitted and/or from among discovery resource pools linked to the selected resource pool/BWP), and may transmit the discovery response message through the selected discovery resource pool/BWP. Specifically, the UE may select at least one discovery resource pool in consideration of at least one of congestion level (or CBR), maximum allowable transmit (Tx) power, CP length (or CP type), and/or SCS for each discovery resource pool.

For example, the UE may select a discovery resource pool (or discovery BWP) having the lowest congestion level (or CBR) from among the plurality of discovery resource pools, may select a discovery resource pool (or discovery BWP) having the largest maximum Tx power, or may select a discovery resource pool (or discovery BWP) having the shortest CP length. Thereafter, the UE may transmit the discovery response message only in the selected discovery resource pool.

Alternatively, when the UE receives a selection message containing information about the selected or recommended resource pool/BWP for communication from a counterpart UE (which has received the discovery message or transmitted the discovery message), the UE may transmit, to the other UE, either a confirmation message indicating reception of the above message or an approval message indicating that the selected/recommended resource pool/BWP for communication will be used in subsequent communication (transmission and/or reception). For example, the UE may transmit the approval message or the confirmation/approval message in the discovery resource pool in which the selection message was received.

Beam Sweeping/Selection

The Tx UE may perform transmission of a discovery message based on beam cycling, and may receive information about the preferred beam of a counterpart UE (e.g., a beam index, an index of a resource linked to the beam, and information about the received RSRP (Reference Signals Received Power) value for a message transmitted by the corresponding beam) based on the received discovery response message. The Tx UE may perform selection of a beam to be used in subsequent communication based on information about the preferred beam. Alternatively, the beam selected through the above procedure may be used for transmission and reception of all or a part of signaling (e.g., control/data/PC5-RRC) of communication data packet transmission.

Figure 11:
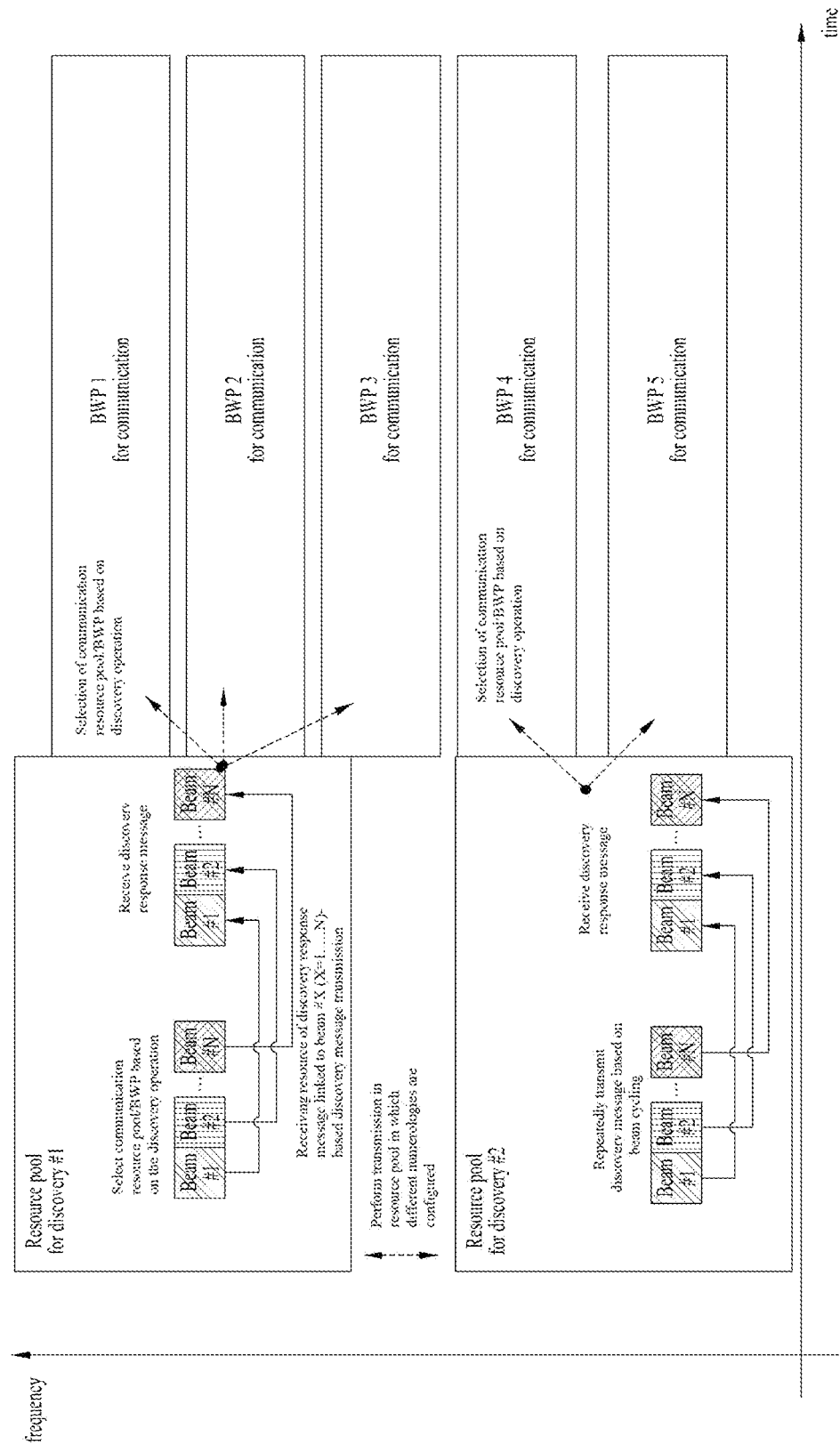
FIG. 11 is a diagram illustrating discovery BWPs interworking with the plurality of BWPs for communication.

Beam cycling may be performed by an RS that is transmitted with the same/different beams together with a discovery message or the entire discovery message. In addition, preferred beam information based on beam cycling may be instructed or inferred through reception of a discovery response message. In other words, i) the preferred beam information is directly included in the discovery response message or ii) the Tx UE configured to use different discovery messages transmitted via different beams or the Tx UE configured to use the discovery message in the discovery response message Tx resources linked to the beam measurement/sweeping RS (Reference Signal) may receive the response message, thereby inferring the preferred beam information. In other words, according to the above-described method (ii), the discovery message transmitted via different beams and/or the beam measurement/sweeping RS transmitted along with the discovery message may be linked to each linked response message Tx resource, and the Rx resources of the linked discovery response message may be subjected to TDM. For example, as shown in FIG. 11, the discovery response message and the entire discovery message (or RS transmitted with the same/different beams along with the discovery message) may be arranged and linked. Although the example of FIG. 11 shows that, in one resource pool, BWP and/or carrier, each discovery message and each discovery response message are shown at the same position within the frequency domain for convenience of description, the scope or spirit of the present disclosure is not limited thereto, and each discovery message and each discovery response message can also be transmitted at different positions within the frequency domain as needed.

Figure 12:
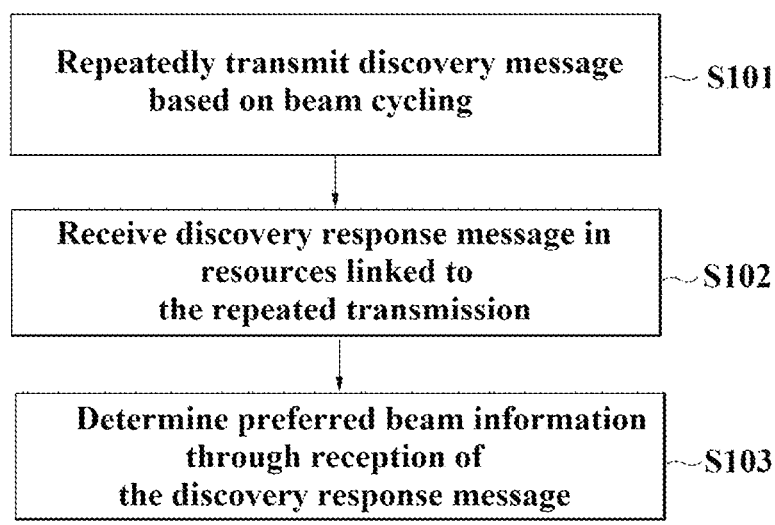
FIG. 12 is a diagram illustrating a method of acquiring information about a preferred beam through a discovery procedure.

Referring to FIG. 12, the Tx UE may determine preferred beam information of the Rx UE based on the above-mentioned method (ii). Specifically, the Tx UE may repeatedly transmit a discovery message based on beam cycling (S101), and may receive a discovery response message from the Rx UE through resources linked with the repeated transmission (S102). The Tx UE may recognize which one of resources is used for reception of the discovery response message, and may determine preferred beam information of the Rx UE (S103).

Meanwhile, the transmission/reception beam width used for such discovery may be different from the transmission/reception beam width used for communication, and information about a beam pair found in the discovery can be utilized as assistance information for determining an initial beam direction of subsequent communication. That is, between beams having different beam widths (e.g., Beam #X, Beam #Y), beam-related information (e.g., Beam #X) obtained based on only one beam width can be used as assistance information for beam determination having different beam widths (e.g., Beam #Y).

For example, when information about a first beam (Beam #X) is utilized as auxiliary information in determination of a second beam, the second beam (Beam #Y) may be determined as any one of a beam having (or a beam directed toward) an absolute direction of a beam selected from among the first beam (Beam #X), a beam having the highest beam gain in relation to the absolute direction of the selected beam, a beam having a high degree of overlap with the first beam (Beam #X), and/or a beam having the highest overlap ratio (or a beam having an overlap ratio that is equal to or greater than a specific reference threshold) with respect to the first beam (Beam #X). Alternatively, the second beam (Beam #Y) may be selected as one beam from among the plurality of beams satisfying the predetermined number of conditions (e.g., 2 conditions) among the above-mentioned conditions by an arbitrary reference or a preconfigured reference.

Alternatively, each of the beams (Beam #X, Beam #Y) having different beam widths may be a beam used for transmission and reception for different channels (or different data packets, different Tx resources) (for example, a carrier, a resource pool, a BWP, etc.), or may be defined as a beam used for transmission and reception of a signal in different frequency bands. For example, one of the first beam (Beam#X) and the second beam (Beam#Y) may be used for transmission and reception of a PSCCH, and the other one may be used for transmission and reception of a PSSCH. Alternatively, one of the first beam (Beam #X) and the second beam (Beam #Y) may be used for SCI (or SA) transmission and reception and the other one may be used for transmission and reception of data. Alternatively, one of the first beam (Beam #X) and the second beam (Beam #Y) may be used for transmission and reception of a discovery channel, and the other one may be used for transmission and reception of a control channel (or a data channel). Alternatively, the first beam (Beam #X) from among the first and second beams (Beam#X, Beam#Y) may be transmitted in a relatively low frequency band as compared to the second beam (Beam#Y). For example, the first beam (Beam #X) may be used for transmission and reception of a signal for use in a 28 GHz band and/or a 5.9 GHz band, and the second beam (Beam #Y) may be used for signal transmission and reception in a 63 GHz band.

Alternatively, the first and second beams (Beam #X, Beam #Y) are used for the same kind of channel, data packet, and transmission resource, but may be temporally separated (may temporally perform preceding or lagging) from each other. In this case, the first beam (Beam #X) may be a beam used for measurement and reporting of received signal strength and/or quality (e.g., RSRP, RSRQ, SINR, etc.) for transmission and reception, or a beam used in advance of the second beam (Beam #Y) in relation to HARQ. Here, the first beam may be different in beam width from the second beam. In this case, the first beam may be larger in width than the second beam, or the first beam may be smaller in width than the second beam.

In this case, the Tx UE for transmitting a message in a discovery resource pool (or discovery BWP) may not be the Tx UE for performing the operation of a signal (e.g., a control signal, a data signal, a PC5-RRC, etc.) transmitted from a resource pool (or BWP) for communication. For example, the Tx UE for transmitting a discovery message may be a target UE for receiving a data packet for communication. In this case, the type (or discovery model A) of the discovery message may be a message indicating "I am here" or may be a message having characteristics of a mode (discovery model B) querying "Who's there".

In other words, the UE for transmitting a discovery message in a discovery resource pool (or discovery BWP) may be a target UE designed to receive a data packet, etc. in the resource pool (or BWP) for subsequent communication. Alternatively, the UE configured to receive a discovery message within a discovery resource pool (or discovery BWP) may be used as the Tx UE designed to receive a data packet, etc. in the resource pool (or BWP) for subsequent communication. In other words, the transmitting and receiving subject of the discovery message is not necessarily identical to the subject to be used in subsequent communication.

Figure 13:
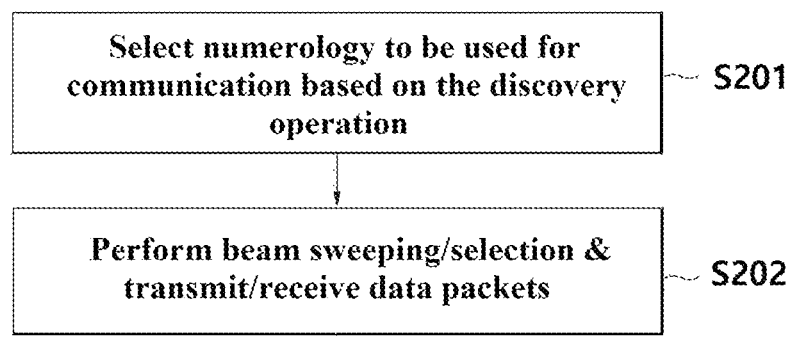
FIG. 13 is a diagram illustrating a method of selecting numerology to be used for communication based on a discovery operation and performing beam sweeping.

FIG. 13 is a diagram illustrating a method of selecting numerology to be used for communication based on a discovery operation and performing beam sweeping.

Referring to FIG. 13, the UE may select numerology to be used for communication based on the discovery operation (S201). There may be a plurality of discovery resource pools configured with different numerologies. According to embodiments of the present disclosure, the UE may select numerology to be used for communication based on the predetermined condition(s). Next, the UE having selected the numerology may perform beam sweeping and beam selection, and may transmit and receive a data packet between the Tx UE and the Rx UE based on the selected beam (S202).

On the other hand, according to the above-mentioned proposed method, i) the UE may select (or recommend) numerology to be used for communication based on reception of the discovery message, or may select (or recommend) the resource pool and/or BWP in which the numerology was configured based on reception of the discovery message, or ii) the UE may allow the selected/recommended resource pool and/or BWP information (e.g., BWP index) to be included in the discovery response message, and may signal the resultant discovery response message. As a result, the UE can recommend or negotiate a communication resource pool and/or BWP between a plurality of UEs using the above method (i) or (ii).

However, the UE may select (or recommend) numerology to be used for communication based on reception of the discovery message and/or the resource pool and/or BWP configured with the numerology, may transmit (or report) the selected/recommended resource pool and/or BWP information (e.g., BWP index) to the BS. Alternatively, the BS may allow each of the corresponding UEs to instruct/select/recommend the communication resource pool and/or BWP (or actual transmit (Tx) resources) as needed.

In addition, the UE having performed transmission and reception of the discovery based on beam cycling may transmit (or report), to the BS, preferred beam information (e.g., a beam index, an index of a resource linked to a beam, a received RSRP value for a message having transmitted via a corresponding beam, etc.) along with the above-mentioned information, and the BS may also instruct (or recommend) the corresponding UEs to recognize beam information to be used for communication as needed.

To this end, the UE having performed transmission and/or reception of the discovery message may transmit (or report), to the BS, (1) information (1) about the selected (or recommended) resource pool and/or BWP based on such transmission/reception of the discovery, may transmit (or report), to the BS, (2) information about the preferred/selected Tx and/or Rx beam information, and/or may transmit (or report), to the BS, (3) a UE ID of a source UE for communication and/or a UE ID of a destination UE for communication.

Alternatively, a first UE (or the Tx UE or the Rx UE) may receive a discovery signal and transmit a discovery response signal. The first UE may acquire information about a plurality of resource regions (BWPs or resource pools) for communication included in the discovery signal, or may acquire information about a plurality of resource regions for communication linked to a discovery resource region (or a discovery BWP or a discovery resource pool) in which the discovery signal was transmitted.

The first UE may select at least two resource regions from among the plurality of resource regions for communication (or sidelink communication), and may transmit a discovery response signal including information about the selected at least two resource regions. Alternatively, the first UE may transmit a discovery response signal including information about at least two selected resource regions, and may receive information about at least one resource region selected from among the at least two resource regions from a counterpart UE. Alternatively, the first UE may acquire, from the discovery signal, information about at least one resource region selected from among the plurality of resource regions, and may transmit a discovery response signal including confirmation information and/or approval information for performing sidelink communication in the acquired resource region.

Alternatively, the first UE may select the first resource region based on at least one of maximum transmission (Tx) power, a congestion level, a priority, and a CP length for each of the plurality of resource regions. Specifically, the first UE may select a resource region having the highest maximum transmission power among the plurality of resource regions, a resource region having the longest CP length among the plurality of resource regions, or a resource region having the lowest congestion level among the plurality of resource regions as the first resource region.

Alternatively, when the first UE supports execution of sidelink communication using the plurality of resource regions, the first UE may select at least one resource region based on at least one of maximum transmission power, a congestion level, a priority, and a CP length from among the plurality of resource regions.

Alternatively, the first UE may receive a discovery signal repeatedly transmitted based on beam cycling. In this case, the first UE may transmit a discovery response signal further including preferred beam information determined on the basis of the discovery signal that is repeatedly received based on beam cycling. The preferred beam information may include a preferred beam index, an index of resources linked to the beam, a reception RSRP value for a message transmitted via the corresponding beam, and the like. The preferred beam information may be used as auxiliary information when determining a beam direction for the sidelink communication.

Alternatively, the first UE may select the first resource region from among the plurality of resource regions in consideration of at least one of the distance to a second UE scheduled to perform the sidelink communication and a minimum coverage.

Alternatively, when the discovery signal is received in each of the plurality of discovery resource regions, the first UE may transmit the discovery response signal only in a discovery resource region linked to the selected first resource region among the plurality of discovery resource regions. Here, the reception of the discovery signal can mean a case where decoding of the discovery signal was successful. That is, when the discovery signal is received in each of the plurality of discovery resource regions, the discovery signal can mean that decoding was successful in each of the plurality of discovery resource regions.

Alternatively, when the first UE is capable of performing a discovery procedure in the plurality of resource regions and/or a communication procedure in the plurality of resource regions, at least one resource region may be selected from among resource regions for full communication linked to a plurality of discovery signals that have succeeded in decoding. When the number of discovery resource regions associated with the selected at least one resource region is a plural number, the first UE may transmit the discovery response message in each of the discovery resource regions.

Alternatively, the first UE may transmit the discovery response signal in only one discovery resource region selected on the basis of at least one of maximum transmission power, a congestion level, and a CP length from among the plurality of discovery resource regions.

Alternatively, the first UE may repeatedly transmit the discovery response signal in each of the plurality of discovery resource regions in which the discovery signals were received.

Alternatively, the first UE may perform sidelink communication with the counterpart UE within the first resource region on the basis of numerology configured in the selected first resource region.

Since examples of the above-described various proposals may also be included as implementation methods of the present disclosure, it is obvious that they may be regarded as a kind of proposed methods.

The present disclosure is not limited to direct communication between UEs, but may also be used in uplink or downlink communication, and at this time, a base station or a relay node can use the proposed method.

Rules can be defined in a manner that information about whether the above-described proposed methods are applied (or information about the rules of the proposed methods) can be signaled from the BS to the UE or from the Tx UE to the Rx UE through pre-defined signaling (e.g., physical layer signaling or higher layer signaling).

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated..

Figure 14:
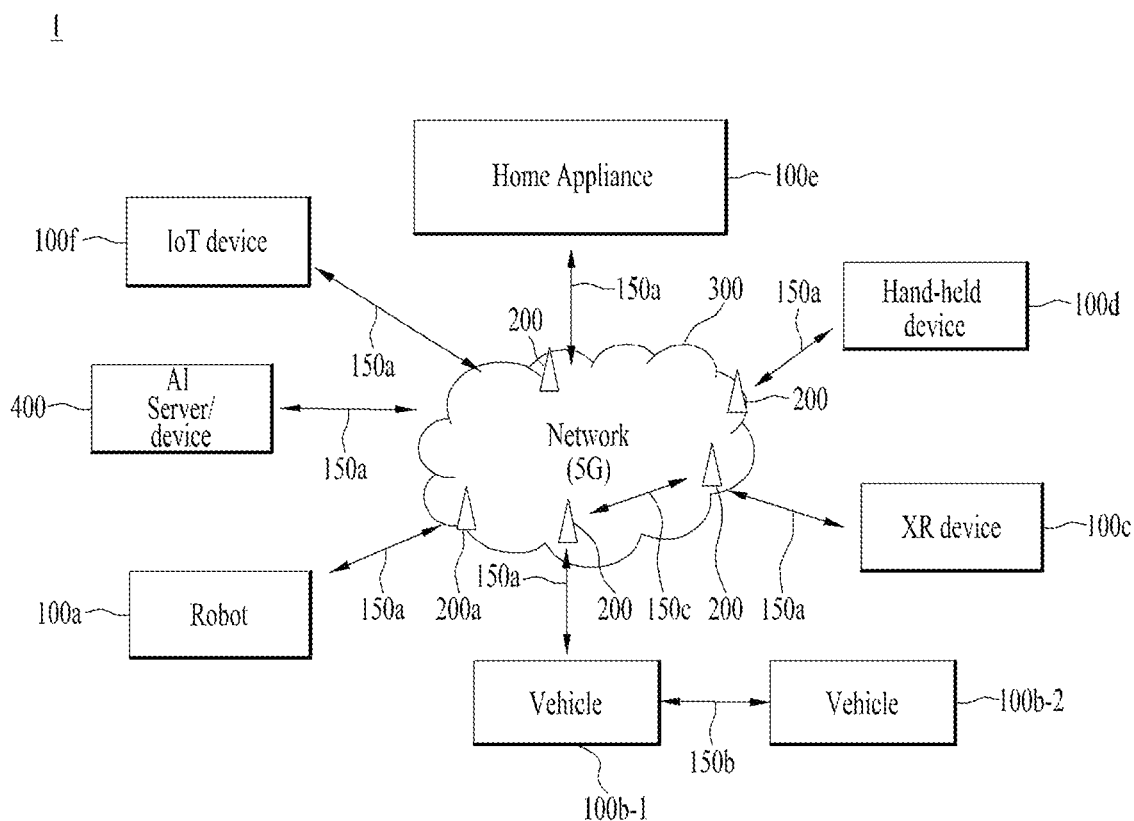
FIG. 14 illustrates a communication system applied to the present disclosure.

FIG. 14 illustrates a communication system applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 15:
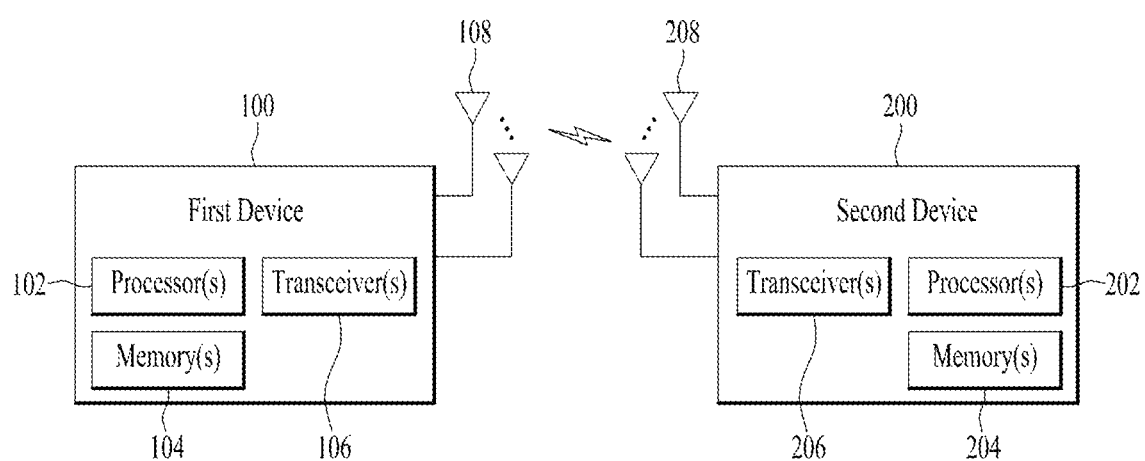
FIG. 15 illustrates wireless devices applicable to the present disclosure.

FIG. 15 illustrates a wireless device applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include a processor 102 and a memory 104 that are connected to the RF transceiver. The memory 104 may include at least one program capable of performing the operation related to the embodiments shown in FIGS. 10 to 13.

The processor (102) may control the RF transceiver to receive a discovery signal or to transmit a discovery response signal, and the discovery response signal may include information about a first resource region selected from among the plurality of resource regions for sidelink communication related to the discovery signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 16:
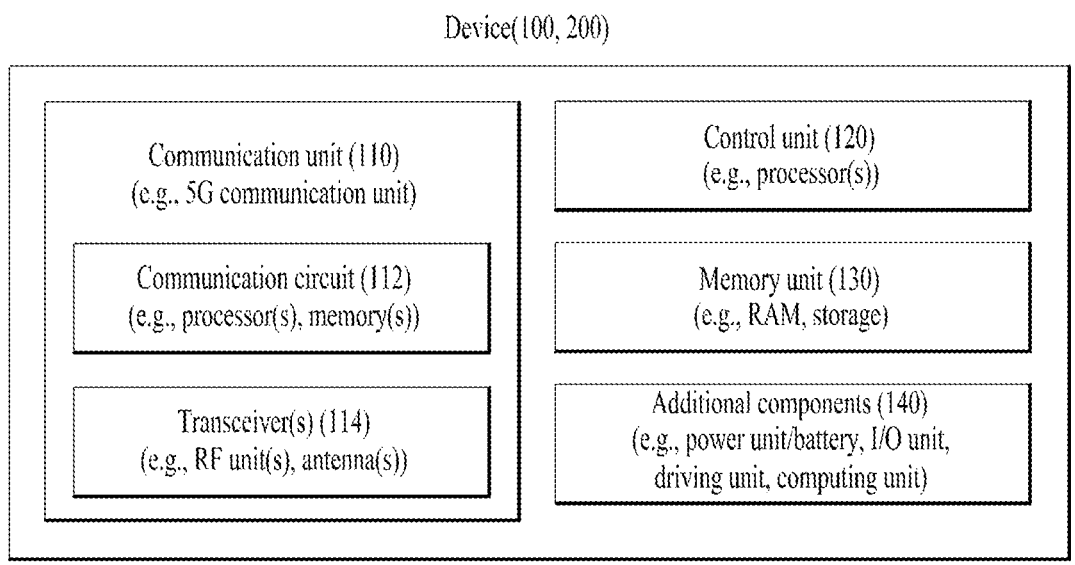
FIG. 16 illustrates another example of a wireless device to which the present disclosure is applied. The wireless device may be implemented in various forms according to use-examples/services.

FIG. 16 illustrates another example of a wireless device applied to the present disclosure. The wireless device may be implemented in various forms according to a use-case/service (refer to FIG. 14)

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 214, the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
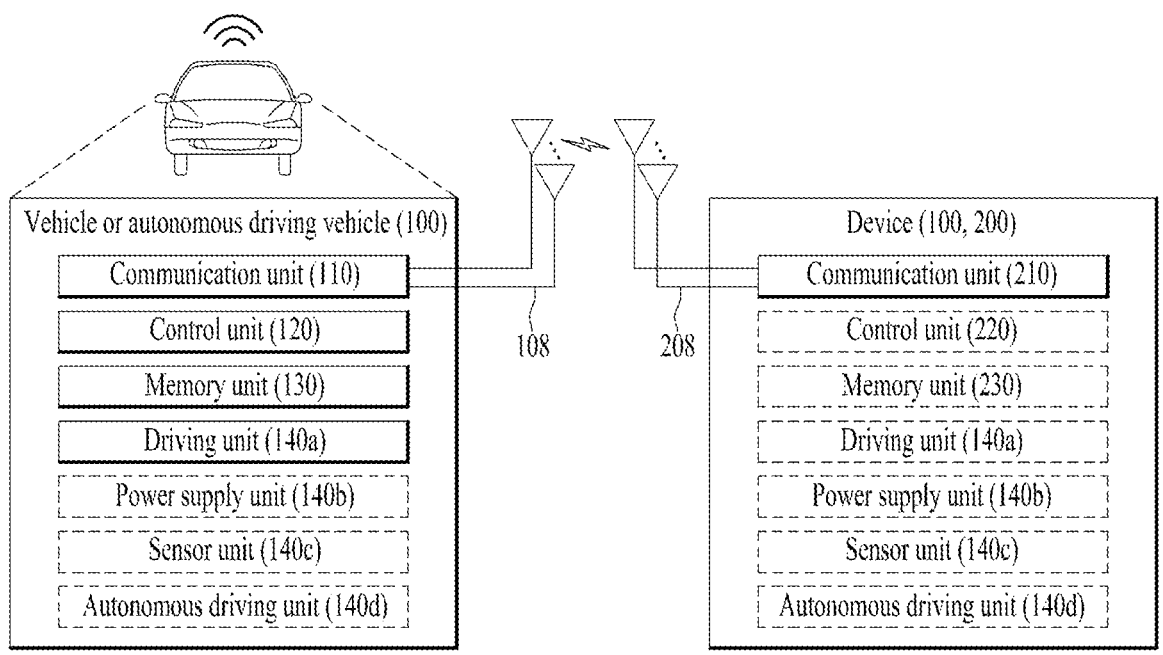
FIG. 17 illustrates a vehicle or an autonomous driving vehicle applied to the present disclosure.

Examples of Vehicles or Autonomous Vehicles to which the Present Disclosure is Applied FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method for performing by a first user equipment (UE) in a wireless communication system comprising:
   receiving, from a second UE, a first signal for discovery; and
   transmitting, to the second UE, a second signal based on the first signal,
   wherein the second signal includes information regarding a first resource region selected from among a plurality of resource regions related to the first signal, and
   wherein the first resource region is selected based on (i) a priority of a packet for the second signal and (ii) a cyclic prefix (CP) length for each of the plurality of resource regions.

2. The method according to claim 1, wherein the first resource region is a resource region having the longest cyclic prefix (CP) length from among the plurality of resource regions based on the priority of the packet for the second signal above a threshold.

3. The method according to claim 1, wherein the first resource region is a resource region selected from among the plurality of resource regions based on at least one of a distance to the second UE and a minimum communication range requirement.

4. The method according to claim 1, wherein the second signal further includes preferred beam information determined based on the first signal that is repeatedly received based on beam cycling.

5. The method according to claim 4, wherein the preferred beam information is used as auxiliary information in determining a beam direction for communication between the first UE and the second UE.

6. The method according to claim 1, wherein when the first signal is received in each of a plurality of discovery resource regions, the second signal is transmitted only in a discovery resource region linked to the first resource region from among the plurality of discovery resource regions.

7. The method according to claim 1, wherein when the first signal is received in each of a plurality of discovery resource regions, the second signal is transmitted in one discovery resource region selected based on at least one of a maximum transmission power, a congestion level, and a cyclic prefix (CP) length from among the plurality of discovery resource regions.

8. The method according to claim 1, wherein when the first signal is received in each of a plurality of discovery resource regions, the second signal is repeatedly transmitted in each of the plurality of discovery resource regions.

9. The method according to claim 1, wherein communication between the first UE and the second UE is performed in the first resource region based on a numerology configured in the first resource region.

10. A first user equipment (UE) in a wireless communication system, the first UE comprising:
    a radio frequency (RF) transceiver; and
    a processor connected to the RF transceiver,
    wherein, under control of the RF transceiver, the processor is configured to receive a discovery signal from a second UE, and transmit a response signal based on the discovery signal to the second UE,
    wherein the response signal includes information regarding a first resource region selected from among a plurality of resource regions related to the discovery signal, and
    wherein the first resource region is selected based on (i) a priority of a packet for the response signal and (ii) a cyclic prefix (CP) length for each of the plurality of resource regions.

* * * * *